Aug. 6, 1935.  B. A. KEARNS  2,010,366
GRINDING MACHINE
Filed Jan. 28, 1930
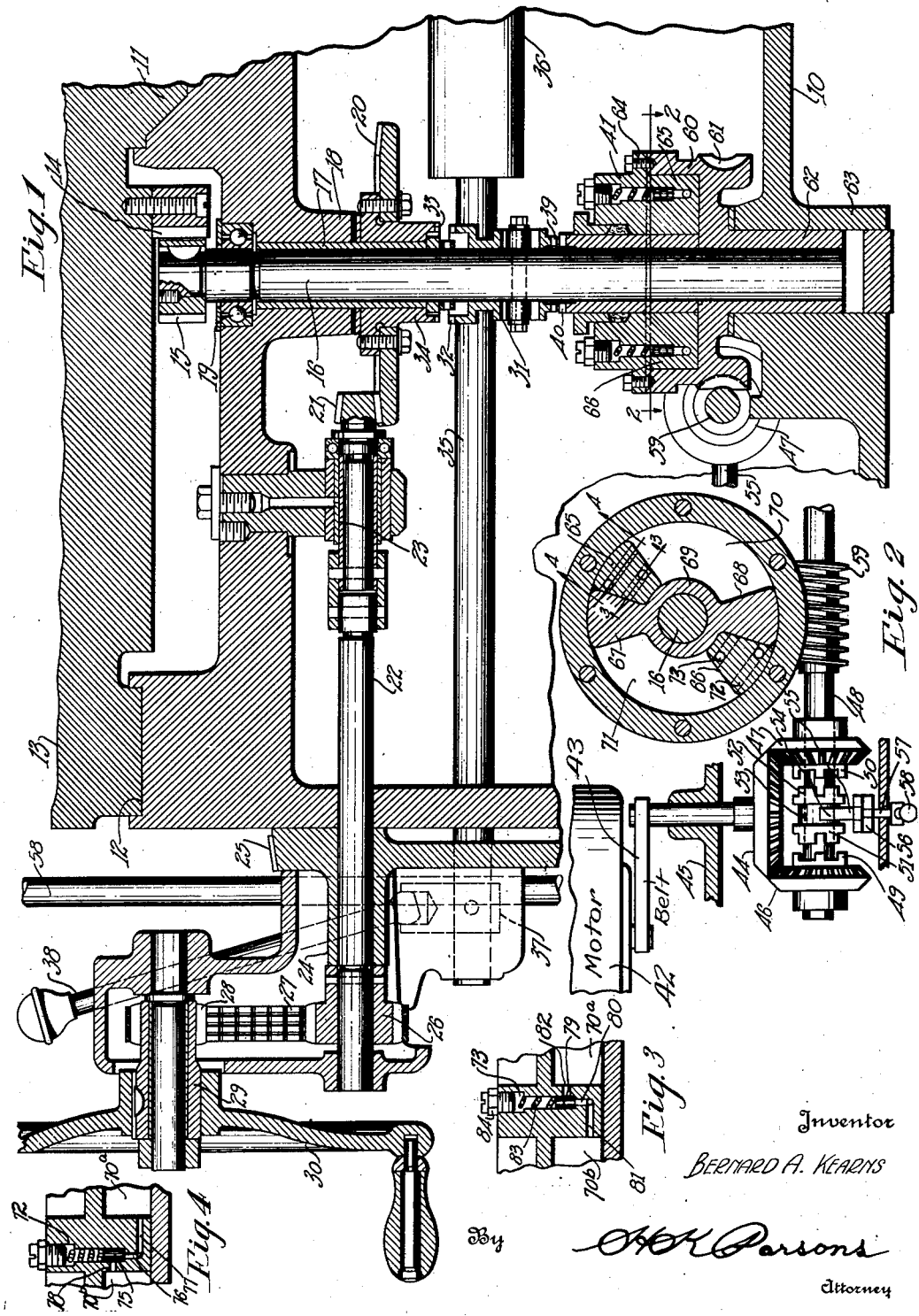
Inventor
BERNARD A. KEARNS
By
A. K. Parsons
Attorney Patented Aug. 6, 1935

2,010,366

UNITED STATES PATENT OFFICE 2,010,366

GRINDING MACHINE

Bernard A. Kearns, Cincinnati, Ohio, assignor to Cincinnati Grinders Incorporated, Cincinnati, Ohio, a corporation of Ohio Application January 28, 1930, Serial No. 424,075

8 Claims. (Cl. 74—27)

This invention relates to improvements in machine tools and especially to improvements in means for effecting the drive of a reciprocable member thereof.

An object of the invention is the provision of improved means for driving the reciprocable member or table of a machine tool such as the work carrying table of a grinding machine.

Another object of the invention is the provision of improved means operative upon reversal of the work carrying table or the like of a machine tool to cushion the shock incident to reversal so that it is not transmitted to the parts.

Another and specific object of the invention is the provision of a cushioning clutch member or the like effective upon reversal of a reciprocable member such as the work supporting table of a grinding machine so that no shock due to the metal to metal driving connection results from said reversal and to permit a slight tarry in the movement of the table before reversal.

Other objects and advantages of the present invention should be readily apparent by reference to the following specification considered in conjunction with the accompanying drawing forming a part thereof and it is to be understood that any modifications may be made in the specific structural details hereinafter disclosed within the scope of the appended claims, without departing from or exceeding the spirit of the invention.

Figure 1 is a fragmentary transverse sectional view through a machine tool such as a grinding machine embodying the improvements of this invention.

Figure 2 is a sectional view taken on line 2—2 of Figure 1.

Figure 3 is a sectional view taken on line 3—3 of Figure 2.

Figure 4 is a sectional view taken on line 4—4 of Figure 2.

Throughout the several views of the drawing similar reference characters are utilized to denote same or similar parts.

A device embodying this invention may comprise a bed or support 10 having formed on the upper surface thereof ways 11 and 12 for guiding a work supporting table or the like 13 longitudinally of the bed 10. The table 13 has secured to its under surface a rack 14 extending substantially throughout the length thereof and in mesh with a driving pinion 15 secured to the end of pinion or driven shaft 16. Shaft 16 is journaled in a bearing 17 carried by a depending lug 18 integral with the bed 10. An anti-friction bearing 19 is mounted in a counterbore formed in the bed 10 and surrounds the shaft to reduce the friction on the shaft during operation. Surrounding the bearing 17 interiorly of the bed is a bevel gear 20 meshing with a bevel pinion 21 on the end of a shaft 22. Shaft 22 is journaled at one end in a suitable bearing 23 carried by the bed 10. The other end of the shaft extends through a bearing 24 of housing 25 and is provided on this end with a pinion 26 coupled through silent chain 27 with a driving pinion 28 formed on the end of hub 29 in driving connection with hand wheel 30. To complete the manual drive from the hand wheel 30 to the pinion 15 a clutch member 31 is provided being splined or otherwise slidably secured to the shaft 16 so as to move therewith during rotation but be independently slidably actuated relative thereto. Clutch 31 is provided with clutch teeth 32 adapted to mesh with clutch teeth 33 formed on the hub 34 of bevel gear 20. A rotatable shift rod 35 journaled at one end in bearing 36 and at the other end in housing 25 is provided with a socket member 37 on its forward end receiving the ball end of shift lever 38 for shifting the rod 35 to cause engagement between the clutch teeth 32 and 33. Reverse actuation of lever 38 causes an engagement between clutch teeth 39 formed on the other end of clutch spool 31 with the clutch teeth 40 formed on the end of one member of the drive clutch 41 to power actuate the table 13.

From the foregoing it will be noted that the work supporting table may be manually actuated through the hand wheel 30 to manually reciprocate the table 13 while to power actuate the same the following mechanism is employed. Prime mover 42 is coupled through silent chain 43 to drive the shaft of bevel gear 44 journaled in a bearing 45 integral with the bed 10. Meshing with the drive gear 44 on opposite sides thereof is a pair of reversing bevel pinions 46 and 47 loosely mounted on the drive shaft 48. Gears 46 and 47 are respectively provided with clutch faces 49 and 50 adapted to respectively engage with clutch faces 51 and 52 of double end clutch spool 53. A shifter fork 54 is provided engaging in a groove formed in the clutch spool 53 and having a stud 55 received in one end of link 56. The other end of the link 56 is secured to stub shaft 57 extending from reverse lever 58 for shifting the clutch in opposite directions to engage either of driven pinions 46 and 47. The reversing mechanism just described is adapted to rotate worm 59 formed integral with drive shaft 48 in either a clockwise or counterclockwise direction for correspondingly driving clutch 41 and shaft 16. Driving clutch 41 comprises cup shaped member 60 having integral therewith worm gear 61 and a depending hub 62 rotatably journaled in bearing 63 formed integral with the bed 10. A closure plate 64 is secured to the upper end of cup member 60 and has depending interiorly thereof driving lugs 65 and 66. The lugs 65 and 66 are diametrically opposite one another and are adapted to engage lugs 67 and 68 integral with the driven member 69 to establish a positive driving connection between the drive and driven shafts. The driven member 69 is provided on its upper end with clutch teeth 40 above described. By this construction chambers 70 and 71 are formed between opposed face of the driven lugs 67 and 68 in which a suitable cushioning medium such as oil is enclosed and through which chambers driving lugs 65 and 66 respectively travel. To avoid shock to the parts caused by the reverse rotation of clutch 41 and to effect a slight tarry of the work supporting table followed by a gradually accelerated speed thereof, the driving lugs 65 and 66 are each provided with a pair of valve chambers 72 and 73 receiving valves 75 and 79 respectively. A port 76 connects valve chamber 72 with inlet port 77 extending to one side of the lug 65 into oil chamber 70a of chamber 70 on one side of lug 65. A second or discharge port 78 connects valve chamber 72 with the oil chamber 70b of chamber 70 on the other side of chamber 70 and the flow therethrough is controlled by the valve 75. Valve chamber 73 is likewise provided with a port 80 connecting same through inlet port 81 with oil chamber 70b. A second or discharge port 82 connects the valve chamber 73 with the oil chamber 70a and the flow therethrough is controlled by valve 79. Each of the valves 75 and 79 has mounted above it a spring 83 abutting on its upper end with an adjusting nut 84 to vary the tension thereof.

The operation of this hydraulic tarry clutch is as follows: Assuming in connection with Figure 2 that the driving lugs 65 and 66 were rotating in a counter clockwise direction to correspondingly rotate the driven lugs 67 and 68 and that through the reversing mechanism the rotation of lugs 65 and 66 is reversed. The cushioning medium or oil in chamber 70 is now between right hand face of lug 68 and the opposed face of lug 65 and the medium in chamber 71 is between the left hand face of the lug 67 and the opposed face of lug 66 all as seen in Figure 2. Upon reversal the face of lugs 65 and 66 in contact with the medium would tend to compress the same between itself and the opposed face of lugs 67 and 68 thereby creating a pressure on the medium. As this pressure builds up to the point of overcoming the inertia of the parts the driven clutch member commences to slowly rotate carrying with it the parts to be driven thereby. At the same time the medium is forced under the pressure into inlet port 77 which pressure builds up to the point of overcoming the tension of springs 83 to raise valves 75 to open discharge ports 78 and permit an escape of the medium from one side of the driving lug to the other. The size of the ports 76, 77 and 78 is such that escape of the medium from one side of the driving lug to the other is slower than the rate of building up of pressure so that by the time all of the medium has been discharged the driving and driven lugs are in engagement and the two members of the clutch are traveling at the same speed. A positive metal to metal driving connection is thereby established without any clashing of the parts and no resultant shock to the machine.

The tensioning nut 84 may be adjusted to increase or decrease the pressure necessary to raise the valves 75 and 79 to thereby adjust the time of tarry and effective operation of the clutch.

From the foregoing description it will be noted that an improved drive for a reciprocating member of a machine tool has been provided and that the said drive may be accomplished either by manual or power means. Also when the power means is employed improved mechanism is provided to take up the shock due to reversal of the parts and to permit a slight tarry or pause in the movement of reciprocating member followed by a gradual speeding up thereof until the proper desired speed is attained.

What is claimed is:

1. A mechanism for cushioning the shock incident of reversing a translatable member of a machine tool organization which includes a transmission line for effecting the translation of the member and means for reversing the direction of drive of the transmission line, in combination, an hydraulic tarry and transmission clutch comprising a driving member, a driven member, means carried by each member for engagement one with the other to establish a positive drive therebetween and means yieldably cushioning the engagement of the driving means, including an enclosed chamber containing the said driving means, an hydraulic medium within the chamber between the driving means, and additional means carried by the driving means permitting the passage of the medium therethrough from between the driving means to beyond the said driving means.

2. A mechanism for cushioning the shock incident to reversing a translatable member of a machine tool organization, which includes a transmission line having a driving shaft, a driven shaft and means for reversing the driving impulse of the driving shaft, in combination, means between the driving and driven shafts absorbing the shock incident to said reversal and for effecting and adjustably determining the duration of a pause in the movement of the translatable member upon reversal comprising a cup shaped member having driving lugs associated therewith and having a cap plate closing the cup to form a chamber interiorly thereof, a driven member having lugs for engagement with the lugs of the driving member, a non-compressable medium between the driving and driven lugs, certain of the lugs having passages formed therein to permit the flow of the medium therethrough, means controlling the flow of the medium through the passages comprising a valve, and yielding means yieldingly limiting movement of the valve.

3. In a reversible power transmission drive the combination with a driving and a driven shaft, of a clutch therebetween for absorbing the shock incident to the reversal, for effecting a tarry prior to reversal and for establishing a diving connection between the driving and driven shafts upon reversal including a cup shaped member, a closure plate for the member forming a sealed chamber interiorly thereof, a driven member carried by the driven shaft and mounted centrally of the driving member, a lug extending from the driven member into the chamber, a lug extending from the driving member into the chamber, and a non-compressible fluid within the chamber intermediate the lugs, one of the lugs having a passage therethrough to permit the escape of the fluid from one end of the chamber to the other as the lugs are brought toward one another for effecting a driving connection therebetween.

4. In a reversible power transmission drive the combination with a driving and a driven shaft, of a clutch therebetween for absorbing the shock incident to the reversal, for effecting a tarry prior to reversal and for establishing a driving connection between the driving and driven shafts upon reversal including a cup shaped member, a closure plate for the member forming a sealed chamber interiorly thereof, a driven member carried by the driven shaft and mounted centrally of the driving member, a lug extending from the driven member into the chamber, a lug extending from the driving member into the chamber, a non-compressible fluid within the chamber intermediate the lugs, one of the lugs having a passage therethrough to permit the escape of the fluid from one end of the chamber to the other as the lugs are brought toward one another for effecting a driving connection therebetween, and means in the passage regulating the rate of flow of the fluid therethrough and thereby controlling the cushioning effect thereof, the amount of tarry and rate of acceleration of the parts upon reversal.

5. In a reversible power transmission drive the combination with a driving and a driven shaft, of a clutch therebetween for absorbing the shock incident to the reversal, for effecting a tarry prior to reversal and for establishing a driving connection between the driving and driven shafts upon reversal including a cup shaped member, a closure plate for the member forming a sealed chamber interiorly thereof, a driven member carried by the driven shaft and mounted centrally of the driving member, a lug extending from the driven member into the chamber, a lug extending from the driving member into the chamber, a non-compressible fluid within the chamber intermediate the lugs, one of the lugs having a passage therethrough to permit the escape of the fluid from one end of the chamber to the other as the lugs are brought toward one another for effecting a driving connection therebetween, means in the passage regulating the rate of flow of the fluid therethrough and thereby controlling the cushioning effect thereof, the amount of tarry and rate of acceleration of the parts upon reversal, said means comprising a valve, a spring engaging the valve and yieldingly resisting movement thereof, and an adjusting screw for changing the yielding resistance of the spring.

6. A machine tool organization which includes a reciprocable member and a shaft for actuating said member, in combination a positive drive couplable with said shaft for operating same, a reversible impositive drive couplable with the shaft for actuating same, means connecting either the positive or impositive drive with the shaft, an hydraulic clutch in the impositive drive for cushioning the shock incident to reversal, said clutch including a pair of clutch members circumscribing said shaft and arranged in telescoping relation and each member having a driving lug adapted to contact with one another, a sealed chamber formed by the clutch members in which are positioned the driving lugs, and an hydraulic medium in the chamber between the non-contacting sides of the driving lugs adapted to escape through and beyond one of the lugs as they are brought toward one another upon reversal.

7. A mechanism for cushioning the shock incident to reversing a translatable member of a machine tool organization which includes a transmission line having a driving shaft, a driven shaft and means for reversing the driving impulse of the driving shaft, in combination, positive clutch means between the driving and driven shafts for transmitting the reverse driving impulse from the driving shaft to the driven shaft and consequently to the translatable member, and adjustable means associated with the clutch means for varying the time interval between the reversing of the driving impulse to the driving shaft and the engagement of the positive clutch means.

8. A mechanism for cushioning the shock incident to reversing a translatable member of a machine tool organization which includes a transmission line having a driving shaft, a driven shaft and means for reversing the driving impulse of the driving shaft, in combination, positive clutch means between the driving and driven shafts for transmitting the reverse driving impulses from the driving shaft to the driven shaft and consequently to the translatable member, and adjustable means associated with the clutch means for varying the time interval between the reversing of the driving impulse to the driving shaft and the engagement of the positive clutch means, said clutch means comprising a cup-shaped member having driving lugs associated therewith and secured to one of the shafts, a cap plate closing the cup and forming a chamber interiorly thereof, and a driven member having lugs for engagement with the lugs of the driving member and secured to the other shaft, the lugs of either the driving or the driven member having ports therethrough, and the tarry means including a non-compressible fluid within the cup chamber adapted to be forced through the ports in the lug, and valve means controlling the flow through said ports.

BERNARD A. KEARNS.